United States Patent [19]

Greenfield

[11] Patent Number: 4,805,133
[45] Date of Patent: Feb. 14, 1989

[54] PROCESSOR MEMORY ELEMENT AND A NEW COMPUTER ARCHITECTURE

[76] Inventor: S. Edmund Greenfield, 183 Main St., Boxford, Mass. 01921

[21] Appl. No.: 811,708

[22] Filed: Dec. 20, 1985

[51] Int. Cl.[4] .............................................. G06F 9/00
[52] U.S. Cl. ................................................... 364/900
[58] Field of Search ................................ 364/200, 900

[56] References Cited
U.S. PATENT DOCUMENTS 4,516,199  5/1985  Frieaer et al. .......................... 364/200

Primary Examiner—Gareth D. Shaw
Assistant Examiner—John G. Mills
Attorney, Agent, or Firm—Bromberg, Sunstein & Casselman

[57] ABSTRACT

A Processor Memory Element [PMEL] is described which includes a method for eliminating the von Neumann bottleneck for executing instructions, resulting in improved performance for executing computer instructions. Also described is a computer architecture based on this element. This computer architecture allows a significant increase in computer speed performance.

5 Claims, 9 Drawing Sheets

PROCESSOR MEMORY ELEMENT AND A NEW COMPUTER ARCHITECTURE

BACKGROUND OF THE INVENTION

1. Field of the invention

The field of the invention generally relates to computing equipment, and more specifically to the architecture of integrated circuit chips and the associated architecture of computers for improving the performance capability of computers.

2. Description of the Prior Art.

1. The key bottleneck in expanding the ability of computers to process information at a faster rate is the sequential nature of the standard Von Neumann architecture currently in use. Although the process of structuring a mathematical problem in a sequential manner appears to be a normal mechanism of human thought processes, once the process to be used is known, it is necessary for the computing device to do as many parallel functions as possible. The need for this is so that the computer can reduce the time to complete the computation to a fraction of the time required by a human. In this manner the computer is serving as an adjunct to the human and is greatly amplifying the human capability.

Various techniques have been explored to speed up the process, mostly in the area of parallel processing of computers. That is, multiple computers are configured to operate in unison. Some approaches have eliminated the Program Counter, which is the primary mechanism for sequential control of program steps. This can be cumbersome however, since programming of the operations now becomes more difficult.

A more productive approach would be to maintain the sequential control, but still eliminate the bottleneck caused be sequencing. Although the delay in fetching the instruction can be eliminated by prefetching the instruction, the von Neumann bottleneck of executing the actual operation is a key problem. Specifically, this process involves the instruction sequentially fetching the data from memory, bringing it out to the arithmetic processor where the operation is performed, and then storing the result back in memory.

OBJECTS OF THE INVENTION

It is therefore an object of the present invention to provide a solution to the von Neumann bottleneck for executing computer instructions which will allow improvements in the performance of computers. This is provided in an element (PMEL) to perform the operations, and an artchitecture which uses these elements in a computer.

It is another object of the invention to provide a technique for the architecture of computers which, by using an expandable computer element, allows greater computing performance by means of modularly adding more of these new elements.

SUMMARY

In accordance with the above objects, a Processor Memory Element (PMEL) is disclosed which comprises memory cells in which a memory word location has associated with it the logic for arithmetic and logical operations. These are organized as follows:

1. The portion of the Processor Memory Element which performs the arithmetic operations resides in the memory cells. Within EACH cell there is a memory word which has an associated arithmetic unit. Memory now consists of addressable memory cells where each cell includes an arithmetic unit.

2. A Program Counter is maintained separate from the processor elements, but controlling the COMBINED processor and memory cells within the Processor Memory Elements (PMEL's).

3. In this manner memory does not have to be exited to perform processing, since the processor is in the memory. This would seem to more closely emulate the poorly understood operation of the human brain, where processing and memory seem to be less differentiated than in the digital computer as used today.

4. Each cell in a Processor Memory Element is equivalent to an arithmetic unit and an accumulator. The accumulator for the arithmetic operations is also the memory cell. The arithmetic unit is not a complete computer, but performs the arithmetic and logic functions for that specific memory cell. The control function in the PMEL controls all the cells.

5. Each location can be be read, or written into, by decoding the address as in a standard memory chip.

6. n busses are used, where each bus is equivalent to reading a specifically addressed memory location. The number of busses is limited only by the physical limitations of the particular chip technology.

7. All operations are now performed on an addressed PMEL at multiple addressed locations, each of which are accessed from one of n busses. Each result is saved in the dedicated accumulator, which also has the function of being a memory location.

8. An operation such as $$Dj \leftarrow Si \text{ plus } Dj$$

where

Dj is the destination accumulator in memory and

Si is the source memory location is completely performed in one cycle. It does not require separate cycles to fetch either Dj or Si, or to store the result in Ai.

9. The Processor Memory Element chip or chips can be implemented in a relatively easy manner using existing Large Scale Integration techniques such MOS (metal oxide semiconductor) or Bipolar semiconductor technology. The limitations are only ones of how many circuits can be placed on a particular chip for a particular implementation technology. For instances where the number of circuits on a chip are limited, more repetitions of the chip will occur.

10. By using expanded read and write decoding, an instruction throughput of over 100 MIPS (Millions of instructions per second) can be achieved for smaller computers with only a single program counter. Using present technology, 1 to 10 MIPS are presently achieved.

11. Significantly, the concept of ease of programming is maintained, since the preferred configuration uses one Program Counter for multiple PMEL chips.

Additionally, computer architecture configurations are shown, where multiple Processor Memory Element units can be paralleled under the control of one Program Controller, and arrays of data can be processed in parallel. Thus, in addition to the mode of multiple instructions with multiple data, the extended parallel function of multiple data on each of the single instruction is performed in parallel. Because of the increase in performance obtained from the basic Processor Memory Element units it is now possible to process in the order of many hundreds of MIPS (millions of instructions per secvond) by paralleling elements in an array.

DETAILED DESCRIPTION OF THE PREFERRED EMBODIMENT

The invention may be applied to all computer applications where increased performance is desired. As will be apparent, the classical operations of a computer can be performed, with the result that the overall throughput is improved over the standard von Neumann architecture.

DESIGN FEATURES

1. Processor Memory Element (PMEL)

Figure 1:
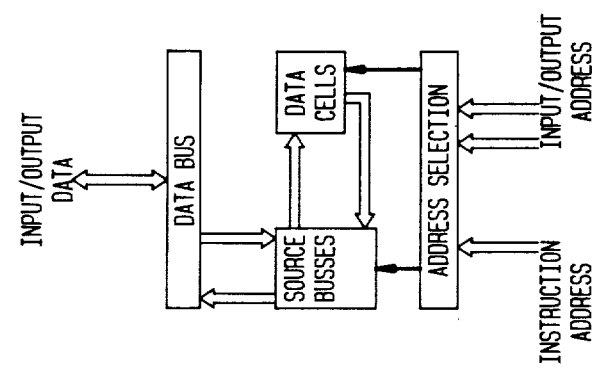
FIG. 1: is a generalized diagram of the Processor Memory Element.
Figure 2:
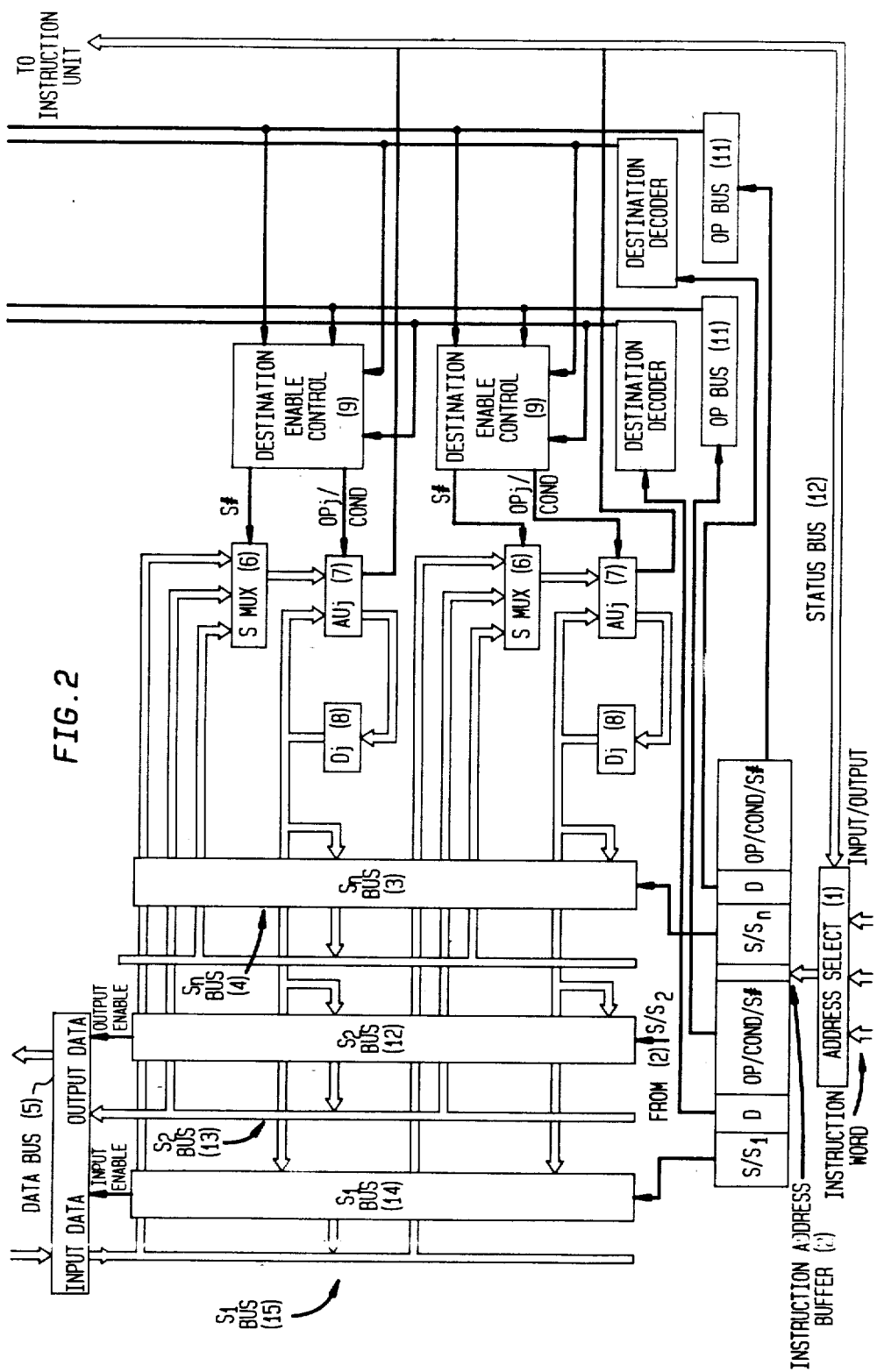
FIG. 2: is a schematic drawing of the Processor Memory Element for data execution incorporating the features of the present invention.

The PMEL is the structure upon which an improved performance computer is based. A key aspect of its structure is the means by which the memory cells and the processor cells are integrated. FIG. 1 is a general drawing of the PMEL and FIG. 2 is a schematic drawing. Memory source words Si are selected to operate on operands Dj, performing an operation on the selected destination pairs. The destination pairs are a destination accumulator Dj and its associated arithmetic unit processor AUj. The operation performed by AUj is Opj. i.e.

Dj ←Si Opj Dj

Si, Dj, Opj Have their addresses all selected at the same time, so that the Source read, the Destination read, and the Operation in the Destination processor are all performed in parallel within the same cycle. The result of the operation is latched into the Destination Accumulator Dj at the end of the same cycle.

The number of these operations which can be performed simultaneously in parallel is expandable by adding additional Source buses and destination decoders in the PMEL chip implementation.

The operation of the Processor Memory Element (PMEL) is initiated by selecting an address in the Address Selection [1]. One form of this address is an Instruction Sub Word.

Instruction Sub Word:

| Si/S#=i | Dj/Opj/Cndj/S#=i |
|---|---|
| Source address field | Destination address field | where:
- Si = Source memory address (location i).
- S# = The identification number of the selected source bus (no. = i).
- Dj = Destination memory address (location j).
- Opj = The operation (instruction) performed on the destination data (accumulator at location j) by the source data.
- Cndj = The condition to be tested and to be placed on the condition bus. This will be used to select the next address (instruction) word.
- S# = This identifies the S# used by the Source address field to the destination.

The PMEL is used both to execute data operations and, with the addition of a Program Control Unit, as an instruction PMEL to store, ouput, and modify Instruction Words, which contain a grouping of Instruction Sub Words as described above. When the PMEL is used for the Instruction Unit, additional program control fields (such as index) are appended to the Instruction word. In the schematic drawing in FIG. 2, the Instruction Word is sent to the Address Select [1] in the Execute PMEL, where it addresses data and operations.

Also sent to the Address Select [1] are addresses for Input and Output. An Input address can be directed to one or more Source Bussess [15] which have Input ports, by means of an S1 Select [14], which is a Source Address Decode and Select for S1. An Output address can also be directed to one or more Source Busses [13] which have Output ports, by means of an S2 Select [12], which is a Source Address Decode and Select for S2. Input and output data will be on the Data bus [5] and occur in parallel with an address word. If the I/O is interrputing, and the source bus is also being allowed to function in a data mode, then the sequence will be modified to reassign the data source bus, or delay the data operation in favor of the I/O, or delay the I/O in favor of the data.

The Address Select [1] also contains a queue for holding the selection of alternate next addresses. This is under control of the conditional field (Cndj) within the destination address field. The status of the conditional operation is received from the Status Bus [12], which contains the results of conditional operations.

The selected address from the Address Select [1] is buffered in the Instruction Address Buffer [2], and distributed to the S1 [14], S2 [12], and Sn [3] Select, which are the Source Address Decode and Select. This is shown in the figure by the distribution to S1 Select [14] and Sn select [3], with all other Si select done in the same way. Sn can be one or more sources for executing operations. The Source Select [3], [12], and [14] are multiple decoders for memory read addresses, with one decoder for each source bus. Each decoded address generates an enable which selects on its Source Bus [4], [13], and [15], the memory data at the decoded memory address.

The selected address from Address Select [1] is buffered in the Instruction Address Buffer [2], and distributed to the Destination Decoders [10] and the op Busses [11].

The Source Busses [4], [13], [15]:

1. Can be used to address a particular Dj memory location. Any number of source busses can be configured. For n source busses, n locations can be read.

2. The Source Bussess [4], [13], [15] can output data from the PMEL for as many busses as have been assigned and dedicated to output data, thus forming an n port read memory.

3. The Source Busses [4], [13], [15] can be selected to write to any memory location by the S Mux [6].

4. The data on the Source Bus [15] may also be input data to the PMEL which has been enabled by the Select [14], and controlled by the Address Select [1].

Data written to a memory cell is selected by the S Mux [6], passed through or operated on by the AU (Arithmetic Unit) [7], and latched in the storage cell (memory location) Dj [8], with each Dj [8] used as an accumulator by each AU [7].

The writing process is controlled by The Destination address field in the Instruction Address buffer [2]. This is distributed to the Destination Decoder [10] and the op Bus [11]. The Destination Decoders [10] are multiple decoders for memory write address, with one decoder for each parallel operation to be performed. Each decoded address selects the op Bus [11] which is tagged with the number of its companion Decoder [11], and which generates enable signals to its Destination Enable Control [9]. These enables specify the operation to be performed, the S# to be selected by the S Mux [6], and the conditional parameters if indicated, for the accumulator (Dj) and the Au pair which are are selected. It also identifies which Source Bus is selected by the S Mux [5]. The process in the PMEL of Dj←Si Opnj Dj takes place in one memory access cycle, with the results latched into the destination accumulator at the end of the cycle.

2. Computer System Instruction Unit Program Counter addressing.

Figure 4:
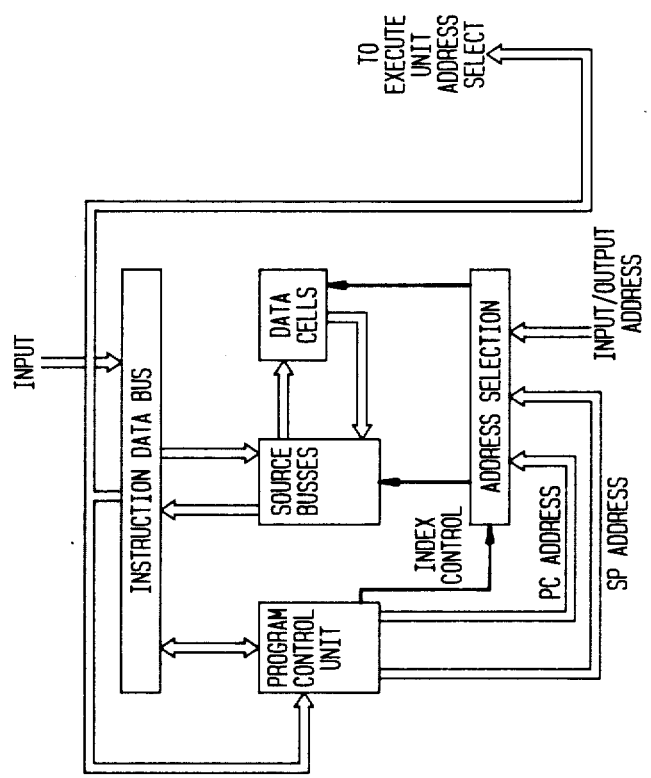
FIG. 4: is a drawing of the Instruction Unit containing the Program Control Unit.

The Program Counter Addressing takes place in the Instruction Unit shown in FIG. 4. Instruction Strings are sent to the Execute Unit, which consist of the Instruction Words which are performed in the Execute Unit. Each Instruction Word contains n Instruction Sub Words. The Instruction Words are addressed by the Program Counter In the Instruction Unit. The following describes the means for performing the addressing of instructions by the Program Counter.

Program Counter address operation instruction sub word:

The following is the instruction sub word for driving a PMEL computer structure.

Instruction Sub Word (ISW) with a Program Control Sub Word:

| Prog Control | Si/S#=i | Dj/Opnj/Cndj/S#=i |
|---|---|---|
| Control field | Source address field | Destination address field |

Instruction Sub Word (ISW)

Prog. Control: This is the Program Control field. This specifies the control of the program sequence, for operations such as Index, Branch, Subroutine Call, and Sub Routine Return. (i.e. Index: Contains the number of repetitions of the instruction. It can be used to control an Instruction Word containing n Sub Words which perform n parallel instructions and n parallel executions. It can also be used to control a single Sub Word).

Si Addr: The source address selects the memory location containing the data word to be placed on the source bus.

Dj Addr: The destination address selects the memory location which will be used as an accumulator.

Opj: This selects the operation to be performed by the arithmetic unit (AUj) on the Dj accumulator.

S #: This selects the source bus to be used by the source address. Cndj: This selects the condition (if any) to be tested and reported on the Status Bus when the operation is to be conditional (e.g. a branch or skip on the condition resulting from the operation). Conditions can include indications such as Carry, Overflow, a Zero result, or a Negative result.

Instruction Word (IW)

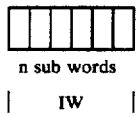

n sub words

| IW |

The Instruction Word which is executed by the PMEL's consists of n Sub Words, in which each Sub Word references a different parallel operation. The entire Instruction Word is executed in parallel within the PMEL or PMEL's.

The Instruction String

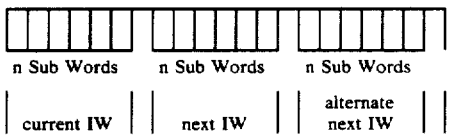

n Sub Words    n Sub Words    n Sub Words

| current IW | | next IW | | alternate next IW |

The Instruciton String is transmitted to the Execute Unit while the current operations are being executed. Thus a prefetch operation is taking place. The length of the Instruction String can be greater than the three shown in the example diagram. The use of multiple source buses in the instruction PMEL allows for the extended Instruction String to be accessed from parallel locations. Wider Instruction Strings allow for additional alternative IW's when sequences of multiple conditional alternative instructions occur. It also allows the option for fewer references to the PMEL Instruction Unit.

The address registers for the Instruction Word queue for the PMEL Execute Unit will hold the current instruction, the next instruction, and the alternate next instruction (to be selected by the condition control). These can be executed to allow for more extensive alternatives.

For example, the possible conditional sequences are described below. The purpose of the procedure is to have the correct IW in the address register of the instructiom queue at the time the IW is to be executed.

| IW being executed | IW simultaneously read into instruction queue | Comment |
|---|---|---|
| IWn−1 | IWn | Execute n−1 while reading n (no cond). |
| IWn | IWn+1(cond) | Execute n while reading n+1. |
| IWn+1(cond) | IWn+2\|a(cond), IWn+2\|b(cond) | Execute n+1 while reading n+2\|a, n+2\|b. (these are alternates for the n+1 condition). |
| IWn+2\|a(cond) | IWn+3\|a>x(cond), IWn+3\|a>y | Select n+2\|a(cond). Execute n+2\|a while reading n+3\|a>x, n+3\|a>y. (these are alternates for the n+2\|a condition. |
| IWn+3\|a>x | IWn+4\|a>x>z, IWn+4\|a>x>w | Select n+3\|a>x(cond). Execute n+3\|a>x while reading the n+4\|a>x>z and x>w alternatives for x. |

The above process shows that whenever the next IW's are conditional, that all alternatives for selection are read into the Address Selection Unit queue while the instruction is being executed. The Address Selection Unit in the execute PMEL is sent the command that the "alternate" next IW is being executed. Thus, this next Instruction String is ready to be the new address and operation values when the time occurs for executing those instruction words.

The above process is fascilitated by incorporating the conditional command as part of the instruction performing the test, and not requiring an additional instruction following the test, and also by the use of the Instruction String in which the PMEL allows multiple IW's to occur in parallel. Because the Instruction String allows multiple IW's, the process can function with n way branches, or multiple alternatives.

3. Computer System Instruction Unit Program Control.

The Program Control Field is included in an Instruction Word, which may contain from 1 to n Instruction Sub Words. When a Multiple Instruc-tion Multiple Data (MIMD) mode is used, the Program Control field is specified in ISW1:

Program Counter =

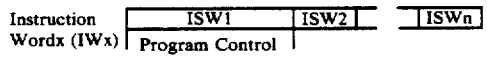

Instruction Wordx (IWx)

The Program Counter contains the address of the current Instruction Word x. The field in ISW1 includes the following controls:

Index = Index value

Branch = Branch address which replaces IWx+1, the next Instruction Word.

Sub Routine = The Sub Routine address becomes the next IW address. The return address (IWx+1) is placed on the control stack.

Sub Routine Return = The return address (ISWx+1) is taken off the stack and used as the address for the next instruction word.

Figure 3:
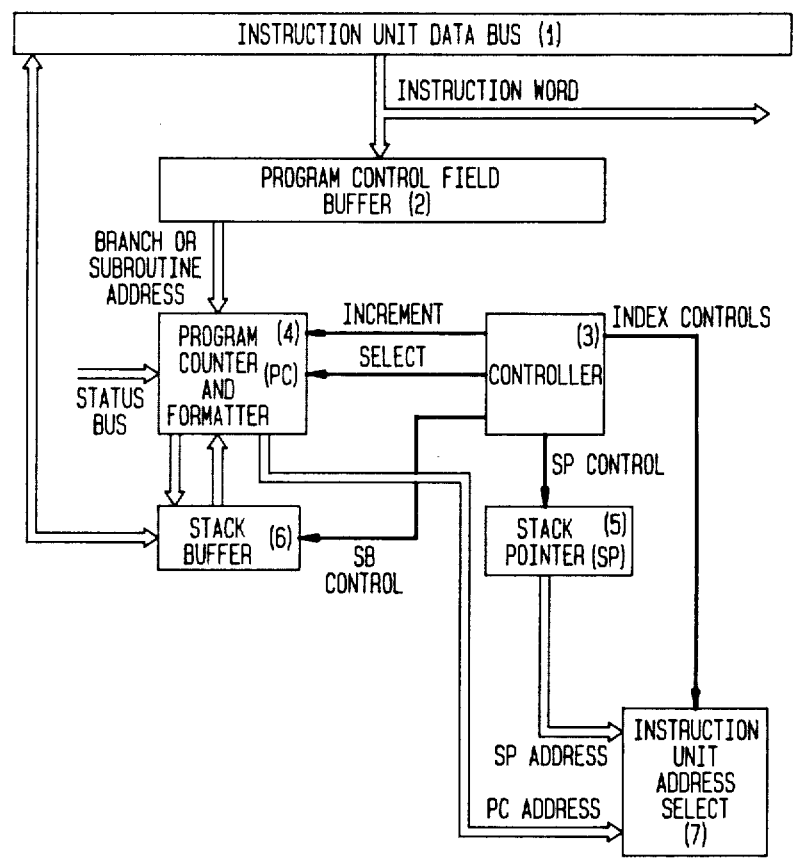
FIG. 3: is a schematic drawing of the Program Control Unit, for use in the Instruction Unit, incorporating the features of the present invention.

The Program Control Unit, shown in FIG. 3, which is part of. the Instruction Unit in FIG. 4, controls the sequencing of program steps, allowing the above control mechanisms to appropriately modify the address of the Program Counter. Thus the Program Counter and the Program Control Unit are additional segments of an execute PMEL (or PMEL's) dedicated as an Instruction Unit to specify a sequence of source addresses in the Instruction Unit. These addresses contain the appropriate instruction words.

In this manner, when appropriate modification of the Program Counter is required, it is performed prior to transmitting the instruction to the Execute PMEL. The only variation to this is for conditional operations dependent on the completion of an instruction execution, as described above, The Program Control Unit is shown in FIG. 3. The Instruction Word from the Instruction Unit Data Bus [1], which is sent to the Execute Unit queue, is also sent in parallel to the Program Control Field Buffer [2]. The Controller [3] decodes the field, and allows the following alternatives to occur:

1. To increment the PC address and format it for transmission to the Instruction Unit Address Select [7] for the next cycle if no modifications are to be performed. This is done in the Program Counter (PC) and Formatter [4]. If the PC address is modified, then the modified address is transmitted to the Instruction Unit Address Select [7].

2. To select a branch address if Branch is specified to be written into the Program Counter [4]and used as the PC address for the next cycle.

3. To select a sub routine address if Sub Routine is specified to be written into the Program Counter [4] and used as the PC address for the next cycle.

4. To move the Program Counter [4] into the Stack buffer [6].

5. To load the value in the Stack Buffer [6] into the Program Counter [4].

6. To decrement orincrement the Stack Pointer (SP) [5] in the conventional manner for pushing the popping data to and from a stack. The Stack Pointer is the address of the location in the Instruction Unit where the Stack Buffer [6] value is read or written. The Stack Buffer [6] always has the same value as the top of the stack, which it either reads from the dedicated stack Source Bus [8], or writes to the stack Source Bus [8].

7. To transmit to the Instruction Unit Address Select [7] the value in the Stack Pointer [5].

8. To transmit the control signals for decrementing the Index field and incrementing the S and D fields for indexing.

The following describes the controls in the Program Control Field:

Index:

Program Counter =

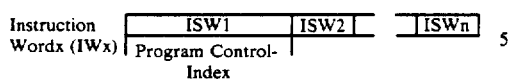

Indexing occurs whenever the Index segment of the Program Control field is indicated. For an indexing operation, a destination address is specified which is identical to the addresses of the Source fields within the IW. The operation specified is "increment". Thus the selected Source is rewritten to its same location, ready to be incremented. The actual incrementing only takes place if the Index(X) field within the Program Control field is non zero. If so, the incrementing operation is allowed. If the X field is zero, then the index control transmits a disable via the Instruction Unit Address Select [7] to the AU enable logic in The Instruction PMEL.

Thus the Source value remains unchanged. The effect of this is to increment the address in the Source memory cell whenever indexing is called for, so that n Sources can operate on one destination. To control the proper sequencing, the Program Counter is not incremented whenever indexing is called for, but fetches the same location which now contains an incremented Source address. Also, the index value is decremented during each cycle, until it reaches zero. At that point indexing is complete.

The uniqueness of this procedure is that each of n source values and the index value can all use separate cell locations (either in one PMEL, or the same address in parallel PMEL's) and be sequenced in the same cycle as the Program Counter read operation.

In summary, the indexing operations are, when $X \neq 0$:
1. Program Counter not incremented. PC ←PC
2. The actual PC word is outputed out ←(PC)
3. The source fields within the instruction words are incremented and rewritten into their cells. Si ←Si+1
4. The index field is decremented. X ←X−1

As an alternate configuration, the non indexable fields can be stored and read from conventional RAM's.

Branch:

Program Counter =

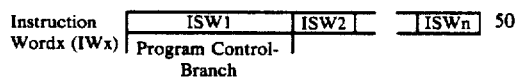

This operation is performed in the same cycle that the Program Counter Instruction Word is transmitted to the queue in the Execute Unit.

| Cycle 1 |
| --- |
| Read (PC) |
| PC< Br Addr |

Thus the contents of the PC [(PC) =IW addressed by PC], are read to the Execute Unit and the Program Control Unit. Since a Branch is requested, the Branch Address (Br Addr) is latched into the PC at the end of the cycle, so the next cycle has the required branch address.

Sub Routine

Program Counter =

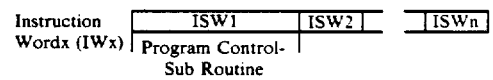

This operation is performed in the same cycle that the Program Counter Instruction Word is transmitted to the queue in the Execute Unit.

| Cycle 1 | Cycle 2 |
| --- | --- |
| Read (PC) | |
| PC < Br Addr | |
| SB < SB | S < SB |

Thus the contents of the PC [(PC=IW addressed by PC], are read to the execute Unit and the Program Control Unit. Since the Sub Routine instruction is a request fir a Branch and Save Program Counter, then the Branch Address (Br Addr) is latched into the PC at the end of the cycle, simultaneous with the Program Counter (PC) being latched into the Stack Buffer (SB), so that the next cycle has the required branch address, and the PC is ready to be saved in the Stack dedicated in the PMEL. In the next cycle, after the PC has been modified, the value in the SB is pushed onto the stack (S).

Sub Routine Return:

Program Counter =

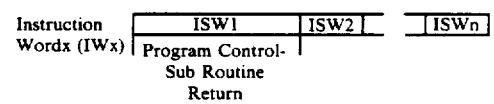

This operation is performed in the same cycle that the Program Counter Instruction Word is transmitted to the queue in the Execute Unit.

| Cycle 1 | Cycle 2 |
| --- | --- |
| Read (PC) | |
| PC < SB | SB < S |

Thus the contents of the PC [(PC)=IW addressed by PC], are read to the Execute Unit and the Program Control Unit. Since the Sub Routine Return instruction is a request for the saved PC value on the stack to be popped and placed in the Program Counter, this is accomplished in one cycle by always having the top of the stack in the Stack Buffer (SB). The return address is taken from the SB and latched into the PC at the end of the cycle, so that the next cycle has the required return address. In the next cycle, after the PC has been modified, the value in the SB is updated by popping the next top of stack value into the SB.

The following sequences show that whenever a cycle 2 operation occurs, it never prevents the address modification from being performed in one cycle in cycle 1, and that cycle 2 is merely after the fact housekeeping.

|  | Cycle 1 | Cycle 2 | Cycle 3 |
|---|---|---|---|
|  | Successive Branches. | | |
| Branch 1: | Read (PC) | | |
|  | PC < Br Addr | | |
| Branch 2: |  | Read (PC) | |
|  |  | PC < Br Addr | |
|  | Successive Sub Routines. | | |
| SubRout 1: | Read (PC) | | |
|  | PC < Br Addr | | |
|  | SB < PC | S < SB | |
| SubRout 2: |  | Read (PC) | |
|  |  | PC < Br Addr | |
|  |  | SB < PC | S < SB |
|  | Successive Returns. | | |
| Return 1: | Read (PC) | | |
|  | PC < SB | SB < S | |
| Return 2: |  | Read (PC) | |
|  |  | PC < SB | SB < S |
|  | Branch/ Sub Routine sequence. | | |
| Branch 1: | Read (PC) | | |
|  | PC < Br Addr | | |
| SubRout 1: |  | Read (PC) | |
|  |  | PC < Br Addr | |
|  |  | SB < PC | S < SB |
|  | Branch/ Return sequence. | | |
| Branch 1: | Read (PC) | | |
|  | PC < Br Addr | | |
| Return 1: |  | Read (PC) | |
|  |  | PC < SB | SB < S |
|  | Sub Routine/ Branch sequence. | | |
| SubRout 1: | Read (PC) | | |
|  | PC < Br Addr | | |
|  | SB < PC | S < SB | |
| Branch 1: |  | Read (PC) | |
|  |  | PC < Br Addr | |

-continued

|  | Cycle 1 | Cycle 2 | Cycle 3 |
|---|---|---|---|
|  | Sub Routine/ Return sequence. | | |
| SubRout 1: | Read (PC) | | |
|  | PC < Br Addr | | |
|  | SB < PC | S < SB | |
| Return 1: |  | Read (PC) | |
|  |  | PC < SB | SB < S |
|  | Return/ Branch sequence. | | |
| Return 1: | Read (PC) | | |
|  | PC < SB | SB < S | |
| Branch 1: |  | Read (PC) | |
|  |  | PC < Br Addr | |
|  | Return/ Sub Routine sequence. | | |
| Return 1: | Read (PC) | | |
|  | PC < SB | SB < S | |
| SubRout 1: |  | Read (PC) | |
|  |  | PC < Br Addr | |
|  |  | SB < PC | S < SB |

4. Computer System Execute Unit Execute mode

Figure 5:
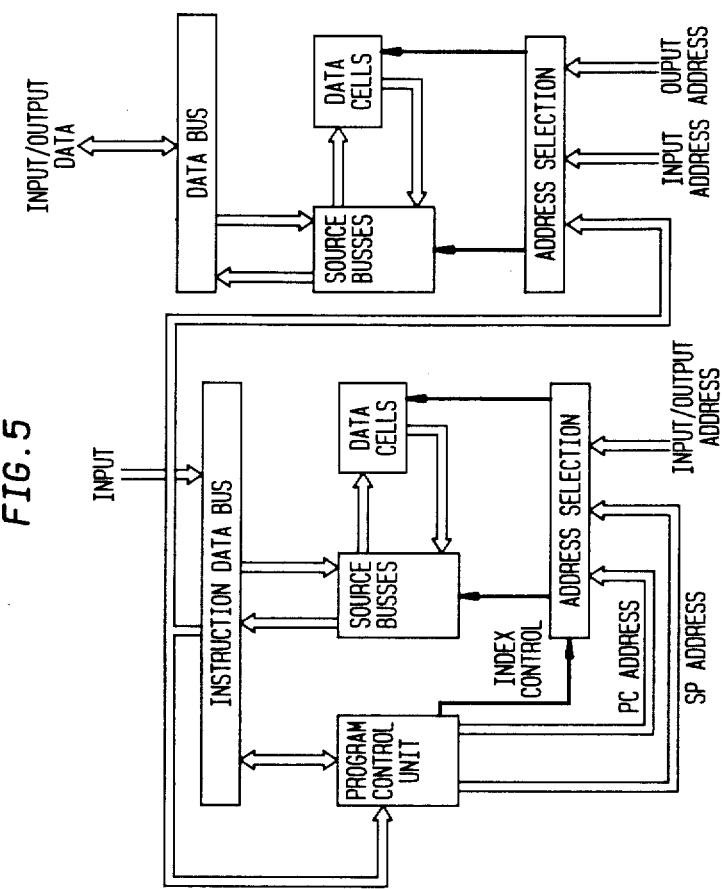
FIG. 5: is a drawing of the Instruction Unit and the Execute Unit linked to form the Processor Memory Element based computer.

The following shows how the equivalent von Neumann operations are performed in less cycles than in a von Neumann structure by using a computer structured with Processor Memory Elements (PMEL's). This computer structure is shown in FIG. 5, where an Instruction Unit and an Execute Unit are formed from PMEL,s are interconnected to form the computer disclosed in this invention.

| von Neumann machine | PMEL structure |
|---|---|
| Two operand operation: | Two operand operation: |
| Load accumulator, Add | Dj < Si plus Dj |
| to it from memory, |  |
| store result in memory. |  |
| 1. Load accumulator from memory. acc ← (m) | 1. *Load accumulator not necessary since Dj = acc. |
| 2. Operation, e.g. add, adds memory to accumulator. acc ← (m) op acc as Si Opj Dj. | *Add to memory selects memory source Si within memory and performs operation Si plus Dj during the memory read cycle. |
| 3. Store result in memory. mem ← acc | *Store is performed by latching the completed operation results in the accumulator (which is destination Dj) at the completion of the read cycle. |
| This operation required 3 references to memory for data. | This operation required 1 reference to memory for data. |
| CYCLE 1 | CYCLE 2 | CYCLE 3 | CYCLE 1 |
| Load accum. | Add to accum. from memory. | Store results in memory. | Perform the operation (e.g. addition) by addition of the source memory value to the addressed destination memory location (also accumulator) and latch (store) the results in the destination. |

Examples of additonal two operand operations which can be performed in the same manner as above:

Subtract, multiply, divide, logical and, logical or, logical exclusive or, compare magnitude, compare logical, and any other instruction requiring two operands.

| von Neuman machine | PMEL structure |
|---|---|
| One operand operation: | One operand operation: |
| Shift left value in memory. | Dj < Dj Left Shift |
| 1. Load accumulator and/or registers. acc ← (m) | 1. *Load accumulator not necessary since Dj = acc. |
| 2. Operation, e.g. shift left the value in accumulator. | *Shift is performed on location within memory and performs operation during the memory cycle without leaving memory, |

-continued

| von Neuman machine | | | PMEL structure |
|---|---|---|---|
| 3. | acc ← acc shift left Store result in memory mem ← acc | | as Opj Dj. *Store is performed by latching the completed operation results in the accumulator (which is destination Dj) at the completion of the read cycle. |
| CYCLE 1 | CYCLE 2 | CYCLE 3 | CYCLE 1 |
| Load accum. from memory | Increment accum. | Store results in memory. | Perform the operation (e.g. shift left) by shifting the value in the destination memory location (also accumulator). This can also be done as a two operand operation in which the destination address is identical to the source address. i.e. Dj < Si + 1 Initial loading from memory and eventual store are unnecessary. |

Examples of additional one operand operations which can be performed in the same manner as above:

Decrement, one's and two's complement, shift, rotate, negate, clear, set, and move, either with no operation or in combination with any of the others.

5. Computer System Execute Unit simultaneous input-/output (I/O).

The PMEL read to I/O or write from I/O can be performed simultaneously with execute operations. By dedicating one or more source busses as input or output busses this is a simple operation with a PMEL.

For outputing from PMEL (read), specific busses can be tapped as output data lines. Thus if bus k has dedicated output lines, then a source address can be specified for bus k, to be read to output data lines. i.e. Read Instruction sub-word:

| S= address | D= I/O Output address and/or PMEL address | Op | S#=k |

The Read instruction sub-word is a programmable instruction independently controlled by an I/O read address in the Address Select Logic. It can also be an independently inserted in either an I/O parallel operation simultaneous with instruction execution, or it can be an interrupt operation.

Thus a read to I/O can be performed from the source bus:

Output ←Sk or both a read to I/O and a parallel operation on Sk can be performed simultaneously:

Output ←Sk

Dj ←Sk Opn Dj

This occurs because the source bus is tapped for the output data, and can still be selected for an internal operation.

For inputing to PMEL (write), specific busses can be tapped as input data lines from I/O. i.e. Write Instruction sub-word:

| S= I/O Input address | D= PMEL address | Opn | S#=k |

Thus if a bus k has inputs from I/O, it can be dedicated to inputing from I/O. It can also be configured to select a source from either the PMEL or from the I/O.

The I/O can be programmable as a Program Counter directed instruction or it can be independently controlled from an I/O write control address in the Address Select Logic. This can be a parallel operation simultaneous with instruction execution, or it can be an interrupt operation.

Thus a write to PMEL from the I/O can be performed from the source bus:

Dj ←Input

Also, an operation can be performed simultaneously on the input:

Dj ←(Sk=Input) Opn Dj

While inputing is not occurring. and if the source bus has also been configured to select a PMEL source, then internal execution operations can take place:

Dj ←Sk Opn Dj

6. Computer System Execute Unit simultaneous PMEL read/write.

In a manner which uses the same techniques as above (6.), reading and writing data between the PMEL and mass storage devices (e.g. disk, bubble memory, or any other magnetic or optical devices), random access memory's, read only memory's, and other PMEL's can be performed.

For PMEL outputing (read)

Output←Sk

For PMEL inputing (write):

Dj←Input

The additional alternatives for I/O will also apply. Also, the data movement and operations can be under program control, or they can be parallel operations simultaneous with instruction execution, or they can be interrupt operations.

7. Cascading Processor Memory Elements

Figure 6:
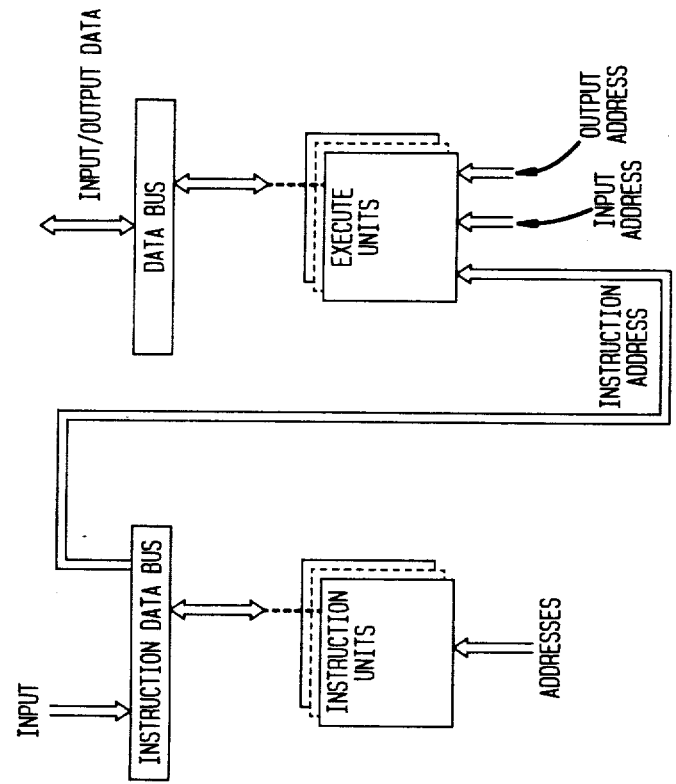
FIG. 6: is a drawing of the computer showing Processor Memory Elements cascaded to increase memory capacity.

In FIG. 6 is shown a variation of FIG. 5, in which the memory and computational capacity of the Instruction Unit and the Execute Unit is expanded. This is done to allow for the expansion of memory for larger amounts of data and instructions.

8. Paralleling Execute Operations

Figure 7:
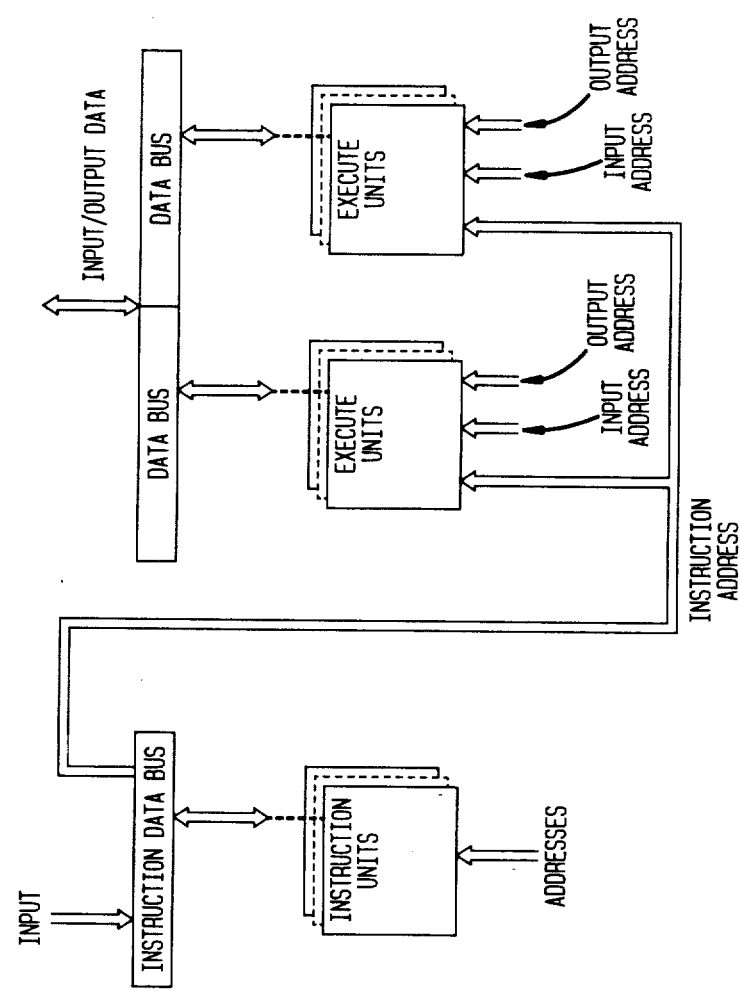
FIG. 7: is a drawing of the computer showing Processor Memory Elements paralled to perform parallel operations.

In FIG. 7 is shown another variation of FIG. 5, in which parallel Execute Units are driven by the same instruction addresses. In this manner, parallel execution of operations on arrays of data can be performed.

9. PMELS Paralleled With Random Access Memories (RAM's).

Figure 8:
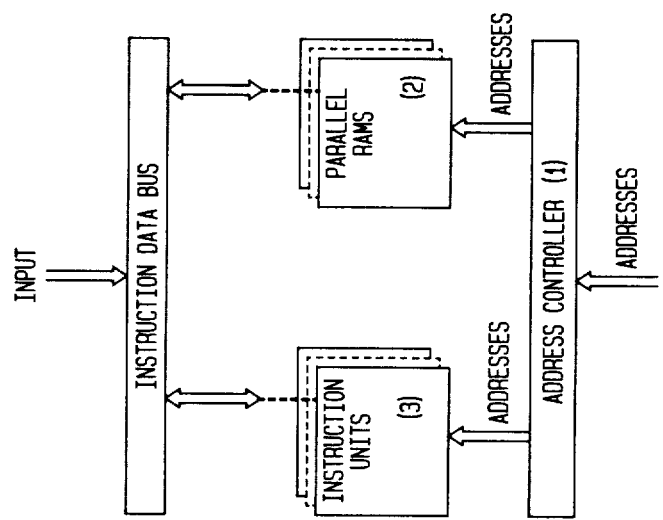
FIG. 8: is a drawing showing the Instruction Unit in parallel with Random Access Memories.

In FIG. 8 is shown another variation of FIG. 5, in which Random Access Memories (RAM's) can be used in conjunction with the PMEL based Instruction Unit. Since not all fields in the Instuction Word require arithmetic modification, then the appropriate fields can be stored and accessed in parallel with PMEL's from RAM's. The Address Controller [1] in FIG. 8 takes in the addresses intended for the Instruction Unit [3], and separates the fields which will address the Parallel RAMS [2].

10. Integrated Instruction Unit and Execute Unit.

Figure 9:
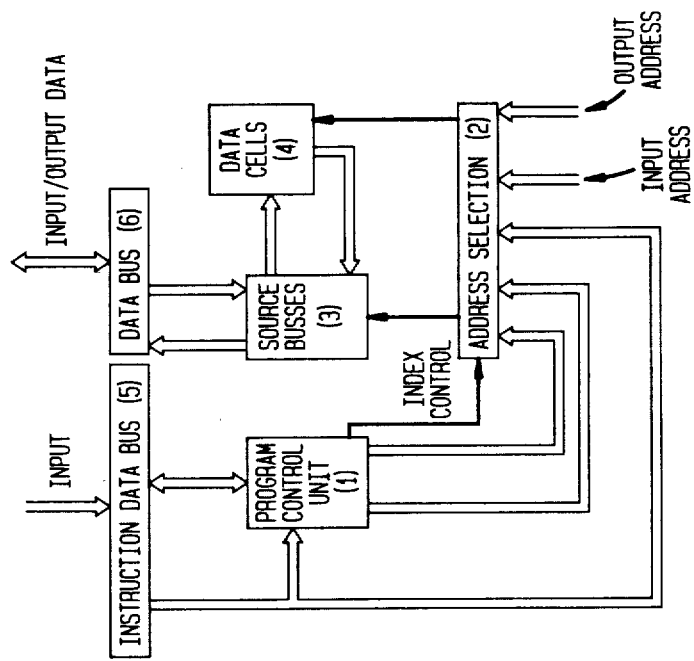
FIG. 9: is a drawing showing the Instruction Unit and the Execute Unit integrated in one Processor Memory Element.

In FIG. 9 is shown another variation of FIG. 5, in which the Instruction Unit and the Execute Unit are integrated in one chip. To do this, the Instruction words from the Source Busses [3] are sent via the Instruction Data Bus [5] to the Address Selection [2] and the Program Control Unit [1]. All addresses, for both data and instructions, are selected by Address Selection [2]. Separate Data Busses are used, the Instruction Data Bus [5] for instructions, and the Data Bus [6] for executing operations.

As is apparent, there are many modifications which can be made to the apparatus described. Therefore, it is the object of the appended claims to cover all such variations and modifications as come within the true spirit and scope of this invention.

What is claimed is:

1. A computer system for performing arithmetic and logic operations, the system comprising:

a plurality of processor memory elements, each processor memory element comprising addressable combination processor and memory cells, each cell including (1) accumulator means for storing data and (2) arithmetic logic means for performing arithmetic and logic operations on the contents of the accumulator means;

a plurality of parallel source bus means in communication with each cell for providing access to the accumulator means and artihmetic logic means of each cell;

source bus selection means for selecting simultaneously a source cell, a destination cell, and one of the source bus means;

execution means for causing the contents of the accumulator means in the source cell to be placed onto the selected source bus means, and for causing the arithmetic logic means of the destination cell to perform arithmetic and logic operations based on the contents of the selected source bus means and on the data contained in the accumulator of the destination cell;

means for inputing and outputing data into and out of the execution means; and instruction means for transmitting a series of instructions to the execution means, the instruction means including means for executing branch, indexing, and subroutine instructions, and further comprising means for controlling and sequencing instruction words with multiple subwords.

2. A computer system according to claim 1, further comprising:

prefetch means for causing the next instruction to be executed to be transmitted to the execution means while a destination arithmetic logic unit is performing an operation.

3. A computer system according to claim 1, further comprising:

means for performing conditional operations as part of the instruction execution cycle and for generating as an output a conditional status result;

means for using the conditional status result to select the next condition-driven instruction.

4. A computer system according to claim 1, further comprising means for grouping and operating the processor memory elements in parallel.

5. A computer system according to claim 4, further comprising:

interfacing means for interfacing between the processor memory elements and other memory and storage elements;

data transfer means for transferring data between the processor memory elements and the other memory and storage elements simultaneously with the execution of instructions within the computer system.

* * * * *